United States Patent Office 2,700,686
Patented Jan. 25, 1955

2,700,686

HYDROXY SUBSTITUTED POLYFLUORINATED COMPOUNDS

Joseph B. Dickey and Edmund B. Towne, Kingsport, Tenn., assignors to Eastman Kodak Company, Rochester, N. Y., a corporation of New Jersey No Drawing. Application February 15, 1951, Serial No. 211,177

6 Claims. (Cl. 260—633)

This invention relates to new hydroxy substituted polyfluorinated compounds. More particularly the invention relates to valuable new aliphatic chlorohydrin and bromohydrin compounds containing two or three fluorine atoms and wherein the fluorine atoms present are attached to the same carbon atom and to a process for preparing the new compounds of the invention.

The invention is particularly directed to the valuable new halohydrin compounds 3,3,3-trifluoro-2-chloro-1-hydroxypropane, 3,3,3-trifluoro-2-bromo-1-hydroxypropane, 3,3,3-trifluoro-2-chloro-2-methyl-1-hydroxypropane, 3,3,3-trifluoro-2-bromo-2-methyl-1-hydroxypropane, 4,4,4-trifluoro-2-hydroxy-1-chlorobutane, 4,4,4-trifluoro-2-hydroxy-1-bromobutane, 3,3-difluoro-2-chloro-1-hydroxypropane, 3,3-difluoro-2-bromo-1-hydroxypropane, 3,3-difluoro-2-chloro-2-methyl-1-hydroxypropane, 3,3-difluoro-2-bromo-2-methyl-1-hydroxypropane, 3,3-difluoro-2-chloro-1-hydroxybutane and 3,3-difluoro-2-bromo-1-hydroxybutane and to a process for preparing these compounds.

The new halohydrin compounds of the invention are prepared by reacting 3,3,3-trifluoropropene $$(CF_3CH=CH_2)$$

3,3,3-trifluoro-2-methylpropene

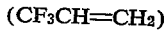

4,4,4-trifluoro-1-butene ($CF_3CH_2CH=CH_2$), 3,3-difluoropropene ($CHF_2CH=CH_2$), 3,3-difluoro-2-methylpropene

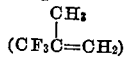

and 3,3-difluoro-1-butene ($CH_3CF_2CH=CH_2$), respectively, with hypochlorous acid and hypobromous acid, respectively, in an aqueous medium.

The hypochlorous acid solution used in the process of the invention can be prepared by a number of well-known methods. A satisfactory method for its production is described in Oragnic Syntheses, Collective Volume 1, page 158. The hypochlorous acid solution can also be prepared by bubbling chlorine into a cold aqueous solution of sodium bicarbonate until the carbon dioxide formed ceases to be evolved. The resulting solution can be used to prepare the new halohydrin compounds. Further, by acidifying an aqueous solution of bleaching powder $$[Ca(OCl)_2 \cdot 4H_2O]$$

with a strong mineral acid hypochlorous acid is formed and the resulting solution can be used to prepare the new halohydrin compounds of the invention. The hypobromous acid solution can be prepared by known methods. It can be prepared, for example, by adding 8 grams of sodium hydroxide dissolved in 24 cc. of water to 16 grams of bromine in 96 cc. of water. These proportions can be followed in preparing larger amounts of hypobromous acid solution.

The new halohydrin compounds because of their high reactivity have wide utility as intermediates. Polyfluorinated alcohols, glycols, ethers and amines, for example, can be prepared by the reaction of the new halohydrin compounds with water, alcohols, ammonia and amines. As illustrated hereinafter, they are of particular value in the preparation of dye compounds suitable, for example, for the dyeing of cellulose ester, especially cellulose acetate, textile materials.

By reacting the new haloghydrin compounds in an alkaline aqueous solution, new polyfluorinated aliphatic alkylene oxide compounds are obtained. These new compounds have the formulas:

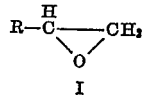

I and

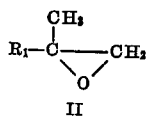

II wherein R represents a trifluoromethyl group, a $\beta,\beta,\beta$-trifluoroethyl group, a difluoromethyl group or an $\alpha,\alpha$-difluoroethyl group and $R_1$ represents a trifluoromethyl group or a difluoromethyl group.

The compounds having the Formulas I and II can be reacted with ammonia and an aliphatic amine such as methylamine, ethylamine, n-propylamine, n-butylamine, $\beta$-hydroxyethylamine, $\beta$-hydroxypropylamine, $\gamma$-hydroxypropylamine, $\beta,\gamma$-dihydroxypropylamine, ethylenediamine, diethanolamine, dimethylamine, diethylamine and di-n-butylamine, for example, to form the compounds having the formulas:

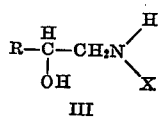

III and

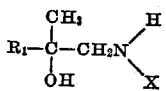

IV wherein R and $R_1$ have the meaning previously assigned to them and X represents, for example, a hydrogen atom, a methyl group, an ethyl group, a propyl group, a butyl group, a $\beta$-hydroxyethyl group, a $\beta$-hydroxypropyl group, a $\gamma$-hydroxypropyl group, a $\beta,\gamma$-dihydroxypropyl group or a $\beta$-aminoethyl group and Y represents, for example, a hydrogen atom, an alkyl group having one to four, inclusive, carbon atoms or a $\beta$-hydroxyethyl group. As described hereinafter those compounds wherein X and Y are hydrogen react readily with anthraquinone and benzene derivatives to yield dyes for cellulose acetate textile materials or dye intermediates useful in preparing dyes for cellulose acetate textile materials.

The new halohydrin compounds of the invention as shown hereinafter react with primary and secondary arylamines such as aniline, m-toluidine, m-ethylaniline, 2-methoxy-5-methylaniline, o-chloroaniline, m-chloroaniline, m-bromoaniline, N-methylaniline, N-ethylaniline, N-isopropylaniline, N-n-butylaniline, N-$\beta$-hydroxyethylaniline, N-$\beta$-hydroxypropylaniline, N-$\gamma$-hydroxypropylaniline, N-$\beta$-hydroxyethyl-m-toluidine, N-$\beta$-hydroxyethyl-m-chloraniline, N-$\beta$-hydroxyethyl-m-bromoaniline, N-$\beta$-cyanoethylaniline, N-$\beta$-cyanoethyl-m-chloroaniline, and N-ethyl-m-chloroaniline, for example. In this reaction a hydrogen atom attached to the nitrogen atom of the arylamine and the chlorine or bromine atom of the halohydrin compound are replaced. Where a primary arylamine is employed, both hydrogen atoms attached to the nitrogen atom can be replaced. Similarly, the new halohydrin compounds of the invention react with tetrahydroquinoline compounds and benzomorpholine compounds having a replaceable hydrogen atom attached to the nuclear nitrogen atom. Illustrative of such compounds are tetrahydroquinoline, 2-methyltetrahydroquinoline, 2,7-dimethyl-tetrahydroquinoline, benzomorpholine and 2-methylbenzomorpholine.

Likewise, the polyfluorinated aliphatic alkylene oxide compounds having the formulas numbered I and II react with the arylamine, tetrahydroquinoline and benzomorpholine compounds referred to in the preceding paragraph. The nature of the reaction will be clear from the following equation illustrating the reaction between 3,3,3-trifluoro-1,2-n-propylene oxide and aniline:

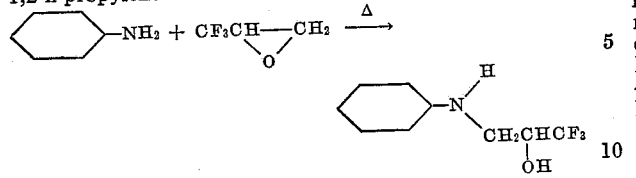

The compounds referred to in the last two paragraphs are useful as intermediates for the preparation of azo dye compounds which color cellulose acetate textile materials. To illustrate, they can be coupled with the diazonium forms of monocyclic nonsulfonated primary arylamines of the benzene series to form such dye compounds. Illustrative of the primary arylamines that can be used are p-nitroaniline, 1-amino-2-chloro-4-nitrobenzene, 2-amino-5-nitrophenylmethylsulfone, 5-nitro-2-trifluoromethylaniline, 1-amino-2-bromo-4-nitroaniline, 1-amino-2-fluoro-4-nitroaniline, p-aminoacetophenone, 1-amino-2-cyano-4-nitroaniline and o-aminophenylmethylsulfone.

Anthraquinone compounds having the formula:

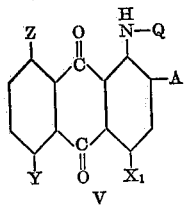

V wherein Q represents a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group or a 4,4-difluoro-2-hydroxybutyl group, $X_1$ represents a hydrogen atom, a hydroxy group, a bromine atom, a β-hydroxyethylamino group, a β-hydroxypropylamino group, a γ-hydroxypropylamino group, a β,γ-dihydroxypropylamino group, a δ-hydroxybutylamino group, a monoalkylamino group having one to four, inclusive, carbon atoms, a monoalkoxyalkylamino group having three to four, inclusive, carbon atoms, a 2,2-difluoroethylamino group, a 2,2-difluoro-n-propylamino group, a 3,3-difluoropropylamino group, a 2,2,2-trifluoroethylamino group, a 3,3,3-trifluoropropylamino group, a 3,3,3-trifluoro-2-hydroxypropylamino group, a 3,3-difluoro-2-hydroxypropylamino group, a 3,3,3-trifluoro-2-methyl-2-hydroxypropylamino group, a 3,3-difluoro-2-methyl-2-hydroxypropylamino group, a 4,4,4-trifluoro-2-hydroxybutylamino group, a 4,4-difluoro-2-hydroxybutylamino group, a phenylamino group or a

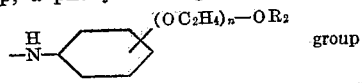 group wherein $R_2$ represents a hydrogen atom, a methyl group or an ethyl group and $n$ represents a small whole integer of from two to three, inclusive, A represents a hydrogen atom or a bromine atom and Y and Z each represent a hydrogen atom or a hydroxy group are readily prepared (as described hereinafter) by reacting the appropriate anthraquinone compound with an amine selected from the group consisting of 3,3,3-trifluoro-2-hydroxypropylamine, 4,4,4-trifluoro-2-hydroxybutylamine, 4,4-difluoro-2-hydroxybutylamine, 3,3-difluoro-2-hydroxypropylamine, 3,3,3-trifluoro-2-methyl-2-hydroxypropylamine and 3,3-difluoro-2-methyl-2-hydroxypropylamine. These compounds are dyes for cellulose acetate textile materials.

By means of the new halohydrin compounds of the invention the anthraquinone compounds having the formula:

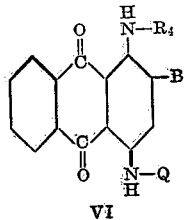

VI wherein Q represents a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group or a 4,4-difluoro-2-hydroxybutyl group, B represents a cyano group, a carboxy group or a —COOR$_3$ group wherein R$_3$ represents an alkyl group having one to four, inclusive, carbon atoms and R$_4$ represents a hydrogen atom, an alkyl group having one to four, inclusive, carbon atoms, a β-hydroxyethyl group, a β-hydroxypropyl group, a γ-hydroxypropyl group, a β,γ-dihydroxypropyl group or a δ-hydroxybutyl group are made possible. These compounds, as the compounds of formula V, are dyes for cellulose ester, particularly cellulose acetate, textile materials. Their preparation is described hereinafter.

The new halohydrin compounds of the invention also make possible the preparation of the anthraquinone compounds having the formula:

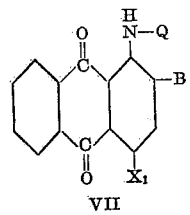

VII wherein Q represents a 3,3,3-trifluoro-2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group or a 4,4-difluoro-2-hydroxybutyl group, B represents a cyano group, a carboxy group or a —COOR$_3$ group wherein R$_3$ represents an alkyl group having one to four carbon atoms and $X_1$ represents a hydrogen atom, a hydroxy group, a bromine atom, a β-hydroxyethylamino group, a β-hydroxypropylamino group, a γ-hydroxypropylamino group, a β,γ-dihydroxypropylamino group, a δ-hydroxybutylamino group, a monoalkylamino group having one to four, inclusive, carbon atoms, a monoalkoxyalkylamino group having three to four, inclusive, carbon atoms, a 2,2-difluoroethylamino group, a 2,2-difluoro-n-propylamino group, a 3,3-difluoropropylamino group, a 2,2,2-trifluoroethylamino group, a 3,3,3-trifluoropropylamino group, a 3,3,3-trifluoro-2-hydroxypropylamino group, a 3,3-difluoro-2-hydroxypropylamino group, a 3,3,3-trifluoro-2-methyl-2-hydroxypropylamino group, a 3,3-difluoro-2-methyl-2-hydroxypropylamino group, a 4,4,4-trifluoro-2-hydroxybutylamino group, a 4,4-difluoro-2-hydroxybutylamino group, a phenylamino group or a

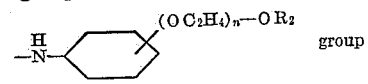 group wherein $R_2$ represents a hydrogen atom, a methyl group or an ethyl group and $n$ represents a small whole integer of from two to three, inclusive. These compounds also are dyes for cellulose ester, especially cellulose acetate, textile materials.

The following examples illustrate the invention.

Example 1.—22 grams of 3,3,3-trifluoro-2-methylpropene, B. P. 6.4° C., were bubbled slowly during 2–3 hours into 0.2 gram mole of a stirred aqueous solution of HOCl kept at —5° C. to 0° C. (the HOCl solution used in this example and the other examples was prepared as described in Organic Syntheses, Collective Volume 1, page 158). The reaction mixture was then stirred for 3 hours more at —5° C. to 0° C. and then was allowed to come up to room temperature. The solution was saturated with sodium chloride and extracted with five 100 cc. portions of ethyl ether. The ether extract was dried over sodium sulfate and then filtered. The ether was distilled off and the residue remaining was fractionated under reduced pressure to yield a small forerun and 19 grams of 3,3,3-trifluoro-2-chloro-2-methyl-1-hydroxypropane, B. P. 67° C.–70° C./37 mm. The product is a water-clear liquid, soluble in ethyl alcohol and ethyl ether and somewhat soluble in water.

By the use of a hypobromous acid solution in place of the HOCl solution in the foregoing example, 3,3,3-trifluoro-2-bromo-2-methyl-1-hydroxypropane is obtained. It also is a water-clear liquid soluble in ethyl alcohol and ethyl ether and somewhat soluble in water.

*Example 2.*—19.2 grams of 3,3,3-trifluoropropene, B. P. −24° C., were very slowly bubbled during 2 to 3 hours into 0.2 gram mole of a stirred aqueous solution of HOCl cooled to −10° C. The reaction mixture was contained in a flask fitted with a sealed stirrer and a Dry Ice condenser. Stirring was continued for 3 hours at −10° C. after the 3,3,3-trifluoropropene had been completely added after which the reaction mixture was allowed to come up to room temperature. It was saturated with sodium chloride and the reaction product which separated as a layer was extracted from the reaction mixture with five 50 cc. portions of ethyl ether. The ethyl ether extract was dried over sodium sulfate and filtered. Then the ether was distilled off from the ether extract and the residue remaining was fractionated under reduced pressure to yield 18 grams of 3,3,3-trifluoro-2-chloro-1-hydroxypropane. The compound is a colorless liquid, slightly soluble in water and soluble in the usual organic solvents. It had a boiling point of 111° C.–115° C.

*Example 3.*—22 grams of 4,4,4-trifluoro-1-butene, B. P. 80° C., was bubbled into a cooled aqueous solution of HOCl (0.2 gram mole) in accordance with the procedure described in Example 2. Upon working up the reaction mixture in the manner described in Example 2, 21 grams of 4,4,4-trifluoro-1-chloro-2-hydroxy-butane, B. P. 70° C.–73° C./36 mm., were obtained. It is a colorless liquid somewhat soluble in water and soluble in the usual organic solvents.

By the use of 0.2 gram mole of a hypobromous acid solution in place of the HOCl solution, 4,4,4-trifluoro-1-bromo-2-hydroxybutane is obtained. It has the same general properties as 4,4,4-trifluoro-1-chloro-2-hydroxybutane.

*Example 4.*—18.4 grams of 3,3-difluorobutene, B. P. 24° C., were bubbled into a cooled aqueous solution of HOCl in accordance with the procedure described in Example 2. Upon working up the reaction mixture in the same manner as described in Example 2, 16 grams of 3,3-difluoro-2-chloro-1-hydroxybutane, B. P. 85° C.–88° C./36 mm., were obtained. It is a colorless liquid, slightly soluble in water and soluble in the usual organic solvents.

By the use of 0.2 gram mole of an aqueous hypobromous acid solution in place of the aqueous HOCl solution used in the above example, a good yield of 3,3-difluoro-2-bromo-1-hydroxybutane is obtained. It is a colorless liquid, somewhat soluble in water and soluble in the usual organic solvents.

*Example 5.*—49 grams of 3,3-difluoropropene were introduced as a gas through a bubbler tube during 2–3 hours into a stirred aqueous solution of HOCl (0.2 gram mole) maintained at 0° C. The reaction mixture was allowed to stand overnight at −2° C. and then was stirred at −5° C. for 3 hours after which it was allowed to come up to room temperature during a period of 2 hours. The reaction mixture was saturated with sodium chloride and the reaction product which separated as a layer was removed by extraction with five 200 cc. portions of ethyl ether. The ethyl ether extract was dried over sodium sulfate and filtered. The ether was distilled off the ether extract and the residue remaining was fractionated through a packed column under reduced pressure. After obtaining a forerun of 6 grams, 43.5 grams of 3,3-difluoro-2-chloro-1-hydroxypropane, B. P. 64° C.–66° C./36 mm. were obtained. It has a boiling point of 138° C.–142° C. at atmospheric pressure. $N_D^{20}$ 1.4113.

It is a colorless liquid, somewhat soluble in water and soluble in the usual organic solvents.

By the use of 0.2 gram mole of an aqueous hypobromous acid solution in place of the aqueous HOCl solution used in the above example, a good yield of 3,3-difluoro-2-bromo-1-hydroxypropane is obtained. It is a colorless liquid, somewhat soluble in water and soluble in the usual organic solvents.

*Example 6.*—19.2 grams of 3,3,3-trifluoropropene, B. P. −24° C., were very slowly bubbled during 2 to 3 hours into 0.2 gram mole of an aqueous hypobromous acid solution cooled to −100° C. The reaction mixture was contained in a flask fitted with a sealed stirrer and a Dry Ice condenser. Stirring was continued for 3 hours at −10° C. after the addition of the 3,3,3-trifluoropropene after which the reaction mixture was allowed to come up to room temperature. Then the reaction mixture was saturated with sodium chloride and the reaction product which separated as a layer was removed by extracting the reaction mixture with five 50 cc. portions of ethyl ether. The ether extract was dried over sodium sulfate and filtered, after which the ether was distilled off from the filtrate. The residue remaining was fractionated under reduced pressure to yield 3,3,3-trifluoro-2-bromo-1-hydroxypropane. It is a colorless liquid, somewhat soluble in water and soluble in the usual organic solvents.

*Example 7.*—18.4 grams of 3,3-difluoro-2-methylpropene were reacted with 0.2 gram mole of an aqueous HOBr solution in accordance with the general procedure described in Example 2. Upon working up the reaction mixture in accordance with the procedure described in Example 2, 3,3-difluoro-2-bromo-2-methyl-1-hydroxypropane is obtained. It is a colorless liquid soluble in ethyl alcohol and ethyl ether and somewhat soluble in water.

By the use of an aqueous HOCl solution in place of HOBr in the foregoing example, 3,3-difluoro-2-chloro-2-methyl-1-hydroxypropane is obtained. It is a colorless liquid, soluble in ethyl alcohol and ethyl ether and somewhat soluble in water.

*Example 8.*—58.5 grams of $CF_3CH_2CH_2CH_2Cl$ were added from a dropping funnel to a gently refluxing solution of 22.4 grams of potassium acetate and 240 cc. of 90% ethyl alcohol. The addition was carried out over a period of 1½ to 2 hours following which the reaction mixture was heated for ½ to 1 hour longer. The 4,4,4-trifluoro-1-butene which collected in the Dry Ice acetone cooled receiver in good yield is a colorless, low boiling, mobile liquid.

*Example 9.*—In a 500 cc. three-necked flask were placed 240 cc. of 90% ethyl alcohol and 22.4 grams of potassium hydroxide. The flask was fitted with an upright condenser and dropping funnel, and the condenser was connected through a calcium chloride filled drying tube to a Dry Ice acetone cooled condenser and receiver.

The mixture was heated to a gentle reflux to dissolve the potassium hydroxide and 63.6 grams of $$CHF_2CH_2CH_2Br$$

were added from the dropping funnel during 1½ to 2 hours. Soon after the addition was begun, the reaction product began to condense in the Dry Ice receiver at a slow but regular rate. After completion of the addition, heating was continued for ½ to 1 hour more. There was obtained a yield of 25.3 grams or 81% of 3,3-difluoro-1-propene, a colorless, mobile liquid boiling at 3°–4° C.

*Example 10.*—124 grams of ethyl difluoroacetate were added dropwise to 350 grams of methyl magnesium iodide containing in 750 grams of diethyl ether. The mixture was stirred and cooled when the reaction became too vigorous. After the addition was complete, the mixture was heated under reflux for three hours and then hydrolyzed by adding dilute hydrochloric acid, shaking, and separating the aqueous layer. The clear ether solution was dried over anhydrous calcium chloride, decanted, and the ether evaporated to obtain difluoromethyldimethyl carbinol

45 grams of the crude difluoromethyldimethyl carbinol thus obtained were added dropwise to 216 grams of phosphorous pentabromide contained in a flask fitted with a condenser, the top of which led to a water scrubber and then through a drying tube to a condenser cooled by means of a Dry Ice acetone mixture. The reaction mixture was heated on a water bath at 50–60° C. while the product collected slowly in the receiver also cooled by a Dry Ice acetone mixture. After about five hours at this temperature the collection of product practically ceased and heating was discontinued. 3,3-difluoro-2-methylpropene was thus obtained in the receiver. A similar amount of 2-difluoromethyl-1,2-dibromoethane remained in the reaction flask.

*Example 11.*—16.3 grams of 3,3,3-trifluoro-2-chloro-2-methyl-1-hydroxypropane were added to 20 cc. of water at 20° C. following which 7.5 grams of finely powdered calcium hydroxide were added with shaking and stirring of the resulting mixture. On standing, a nonaqueous layer of reaction product separated and was distilled off under slightly reduced pressure by heating the mixture on a water bath. After drying and fractionating the product under reduced pressure, a 75% yield of pure 2-trifluoromethyl-2-methylethylene oxide having the formula:

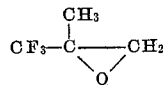

was obtained.

By the use of 14.5 grams of 3,3-difluoro-2-chloro-2-methyl-1-hydroxypropane in place of 3,3,3-trifluoro-2-chloro-2-methyl-1-hydroxypropane in the example just given, 2-difluoromethyl-2-methylethylene oxide is obtained.

Example 12.—To 14.5 grams of 3,3-difluoro-2-chloro-1-hydroxybutane were added slowly with stirring 20 grams of a 20% solution of sodium hydroxide in water. Stirring was continued at 20–25° C. for 15 to 30 minutes following which the nonaqueous layer which separated was distilled off. The product was purified by drying and fractionally distilling it under slightly reduced pressure. A 70% yield of 3,3-difluoro-1,2-n-butylene oxide having the formula:

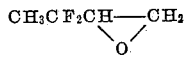

was obtained.

Example 13.—To 14.9 grams of 3,3,3-trifluoro-2-chloro-1-hydroxypropane were added slowly with stirring 20 grams of a 20% solution of sodium hydroxide in water. Stirring was continued at 20–25° C. for 15 to 30 minutes following which the nonaqueous layer which separated was distilled off. The product was purified by drying and fractionally distilling it under slightly reduced pressure. A good yield of 3,3,3-trifluoro-1,2-propylene oxide having the formula:

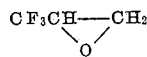

was thus obtained.

Example 14.—To 16.3 grams of 4,4,4-trifluoro-2-hydroxy-1-chlorobutane were added slowly with stirring 20 grams of a 20% aqueous solution of sodium hydroxide. Stirring was continued at 20–25° C. for 15 to 30 minutes following which the non-aqueous layer which separated was distilled off. The product was purified by drying and fractionally distilling it under slightly reduced pressure. A good yield of 4,4,4-trifluoro-1,2-butylene oxide was thus obtained.

Example 15.—To 13 grams of 3,3-difluoro-2-chloro-1-hydroxypropane were added portionwise with stirring 20 grams of a 20% aqueous sodium hydroxide solution. Stirring was continued at 20–25° C. for 15 to 30 minutes following which the nonaqueous layer which separated was distilled off. The product was purified by drying and fractionally distilling it under slightly reduced pressure. A good yield of 3,3-difluoro-1,2-propylene oxide was thus obtained.

It will be understood that in Examples 11 to 15, inclusive, an equivalent amount of the corresponding bromohydrin compound can be used in place of the chlorohydrin compound. Thus 3,3,3 - trifluoro-2-bromo-2-methyl-1-hydroxypropane can be used in place of 3,3,3-trifluoro-2-chloro-methyl-1-hydroxypropane in Example 11.

Example 16.—25.2 grams of 2-trifluoromethyl-2-methylethylene oxide were added dropwise over a period of about one hour to 125 cc. of a concentrated aqueous ammonia solution. Cooling and stirring were carried on throughout the addition to prevent any rapid rise in temperature. The reaction mixture was then carefully heated to about 50° C. and maintained at this temperature for a short time following which ammonia and water were distilled off. The residue was fractionally distilled under reduced pressure to obtain a 70% yield of pure 3,3,3-trifluoro-2-methyl-2-hydroxypropylamine. As by-products there were also obtained small amounts of the secondary and tertiary amine.

By the use of 21.6 grams of 2-difluoromethyl-2-methylethylene oxide in place of 2-trifluoromethyl-2-methylethylene oxide in the above example, 3,3-difluoro-2-methyl-2-hydroxypropylamine is obtained.

Example 17.—25.2 grams of 4,4,4-trifluoro-1,2-butylene oxide and 30 cc. of concentrated aqueous ammonia were added to 200 cc. of water contained in a shaking autoclave and the autoclave was sealed. The mixture was heated to 60° C. and maintained at this temperature with shaking for about one hour. The autoclave when then cooled, opened, and its contents were heated to distill off ammonia and water. The residue was fractionally distilled to obtain an excellent yield of 4,4,4-trifluoro-2-hydroxybutylamine.

By the use of 21.6 grams of 4,4-difluoro-1,2-butylene oxide in place of 4,4,4-trifluoro-1,2-butylene oxide in the above example, 4,4 - difluoro - 2 - hydroxybutylamine is obtained.

Example 18.—22.4 grams of 3,3,3-trifluoro-1,2-propylene oxide and 30 cc. of concentrated aqueous ammonia were reacted together, and the reaction mixture was worked up in accordance with the procedure described in Example 17 to obtain 3,3,3-trifluoro-2-hydroxypropylamine.

By the use of 18.8 grams of 3,3-difluoro-1,2-propylene oxide in place of 3,3,3-trifluoro-1,2-propylene oxide in the above example, 3,3-difluoro-2-hydroxypropylamine is obtained.

Example 19.—21.6 grams of 3,3-difluoro-1,2-n-butylene oxide were added dropwise over a period of about one-half hour to 140 grams of a 60% aqueous solution of ethylenediamine, while stirring and maintaining a temperature of 70° C. After the addition was complete, heating and stirring were continued for one hour. The product formed was recovered by fractionally distilling the reaction mixture. A good recovery of excess ethylenediamine and an 85% yield of N-β-aminoethyl-3,3-difluoro-2-hydroxy-n-butylamine

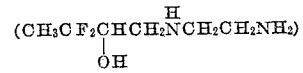

were obtained.

Example 20.—25.2 grams of 2-trifluoromethyl-2-methylethylene oxide were added dropwise over a period of about one hour to 120 grams of a 25% aqueous solution of methylamine. Cooling and stirring were carried on throughout the addition to prevent any rapid rise in temperature. The reaction mixture was then carefully heated to about 50° C. and maintained at this temperature for a short time following which methylamine and water were distilled off. The residue was fractionally distilled under reduced pressure to obtain a good yield of pure N - methyl-3,3,3-trifluoro-2-methyl-2-hydroxypropylamine.

Example 21.—In a shaking autoclave were placed 22.4 grams of 3,3,3-trifluoro-1,2-propylene oxide, 21 grams of diethanolamine, and 20 cc. of water. After sealing the autoclave the mixture was heated to 180° C. and maintained at this temperature with shaking for six hours. When cool, the autoclave was opened and the products fractionally distilled to obtain a good yield of N,N-(di-β-hydroxyethyl)-3,3,3-trifluoro-2-hydroxypropylamine.

Following the procedure described in Examples 16 to 21, inclusive, N-n-butyl-3,3,3-trifluoro-2-hydroxypropylamine, N,N-(di - β - hydroxyethyl)-3,3,3-difluoro-2-hydroxypropylamine, N,N-(di-n-butyl)3,3,3-trifluoro-2-hydroxypropylamine, N,N - (dimethyl)-3,3-difluoro-2-hydroxypropylamine, etc. are readily prepared.

Example 22.—10 grams of 3,3,3-trifluoro-1,2-propylene oxide were added to 50 grams of aniline and the reaction mixture thus obtained was heated in a shaking autoclave at 180° C. for 8–12 hours. When cool the reaction mixture was removed from the autoclave and the reaction product was extracted from the reaction mixture with methyl alcohol, following which the methyl alcohol was fractionally distilled under reduced pressure (e. g. 5–10 mm.). A good yield of N-β-hydroxy-γ-trifluoropropylaniline was obtained as a water-white liquid. A small amount of N-bis-β-hydroxy-γ-trifluoropropylaniline was obtained as a by-product.

Example 23.—18.6 grams of aniline and 44.8 grams of 3,3,3-trifluoro-1,2-propylene oxide were reacted together in a shaking autoclave at 180° C. for about 8 hours. When cool, the reaction mixture was removed and fractionally distilled under reduced pressure to obtain N-bis-β-hydroxy-γ-trifluoropropylaniline.

*Example 24.*—12 grams of N-ethylaniline and 12 grams of 3,3,3-trifluoro-1,2-propylene oxide were reacted together in accordance with the procedure described in Example 23. Upon fractionating the reaction mixture under reduced pressure, N-ethyl-N-β-hydroxy-γ-trifluoropropylaniline was obtained.

*Example 25.*—10 grams of 3,3-difluoro-1,2-propylene oxide were reacted with 50 grams of aniline in accordance with the procedure described in Example 22. Upon fractionally distilling the reaction mixture under reduced pressure, N-β-hydroxy-γ-difluoropropylaniline was obtained.

*Example 26.*—12 grams of 3,3-difluoro-1,2-n-butylene oxide were reacted with 50 grams of aniline in accordance with the procedure described in Example 22. Upon fractionally distilling the reaction mixture under reduced pressure, N-β-hydroxy-γ-difluoro-n-butylaniline was obtained.

Following the procedure described in Examples 22 to 26, inclusive, N-β-hydroxy-β-methyl-γ-trifluoropropylaniline, N - β - hydroxy-β-methyl-γ-difluoropropylaniline, N - β-hydroxy-δ-trifluorobutylaniline, N-β-hydroxy-γ-trifluoropropyl-m-toluidine, N-β-hydroxy-γ-trifluoropropyl-m - chloroaniline, N-β-hydroxy-γ-difluoropropyl-m-toluidine and N-β-hydroxy-γ-difluoropropyl-m-chloroaniline, for example, are readily prepared.

*Example 27.*—13.5 grams of N-ethyl-m-toluidine, 10 grams of sodium bicarbonate and 16.3 grams of 3,3,3-trifluoro-2-chloro-1-hydroxypropane were reacted together at 140° C. until no more carbon dioxide was evolved. Then the reaction product was extracted from the reaction mixture with methyl alcohol and the extract was fractionally distilled under reduced pressure to obtain N-ethyl - N - α - trifluoromethyl-β-hydroxyethyl-m-toluidine having the formula:

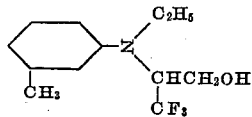

*Example 28.*—13.7 grams of N-β-hydroxyethylaniline, 18 grams of 4,4,4-trifluoro-2-hydroxy-1-chlorobutane and 10 grams of sodium bicarbonate were reacted together, and the reactio nmixture was worked up, in accordance with the procedure described in Example 27. N-β-hydroxyethyl-N-β-hydroxy-δ-trifluorobutylaniline was obtained.

*Example 29.*—9.3 grams of aniline, 14.4 grams of 3,3-difluoro-2-chloro-1-hydroxypropane and 10 grams of sodium bicarbonate were reacted together, and the reaction mixture was worked up, in accordance with the procedure described in Example 27. N-α-difluoromethyl-β-hydroxyethylaniline was obtained.

*Example 30.*—13.3 grams of tetrahydroquinoline and 12 grams of 3,3,3-trifluoro-1,2-propylene oxide were reacted together in accordance with the procedure described in Example 23. Upon fractionally distilling the reaction mixture under reduced pressure, N-β-hydroxy-γ-trifluoropropyltetrahydroquinoline was obtained.

*Example 31.*—By the use of 13.1 grams of benzomorpholine, i. e.

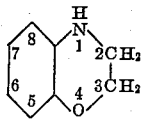

in place of tetrahydroquinoline in Example 30, N-β-hydroxly-γ-trifluoropropylbenzomorpholine was obtained.

*Example 32.*—13.3 grams of tetrahydroquinoline, 18 grams of 4,4,4-trifluoro-2-hydroxy-1-chlorobutane and 10 grams of sodium bicarbonate were reacted together in accordance with the procedure described in Example 27. N - β - hydroxy-δ-trifluorobutyltetrahydroquinoline was obtained.

*Example 33.*—13.1 grams of benzomorpholine, 14.4 grams of 3,3-difluoro-2-chloro-1-hydroxypropane and 10 grams of sodium bicarbonate were reacted together in accordance with the procedure described in Example 27. N-α-difluoromethyl-β-hydroxyethylbenzomorpholine was obtained.

Following the procedures described hereinbefore N-β-hydroxyethyl-N-β-hydroxy-γ-difluoropropylaniline, N-β-hydroxyethyl - N-β-hydroxy-γ-trifluoropropylaniline, N-β - hydroxyethyl-N-β-hydroxy-γ-trifluoropropyl-m-chloroaniline, N - β-hydroxy-γ-trofluoropropyl-2-methyltetrahydroquinoline, N - β - hydroxy-γ-trifluoropropyl-2,5-dimethyltetrahydroquinoline, N - β-hydroxy-γ-difluoropropyl-2-methylbenzomorpholine, N-β-hydroxy-γ-difluoropropyl-2,5-dimethylbenzomorpholine, N-β-hydroxy-γ-trifluoropropyl-2-methylbenzomorpholine, N-β-hydroxy-γ-trifluoropropyl-α-naphthylamine, N-β-hydroxy-γ-difluoropropyl-α-naphthylamine, 1 - N-β-hydroxy-γ-trifluoropropylamino - 5 - naphthol, N-β-hydroxy-δ-trifluorobutyl-α-naphthylamine, etc., are readily prepared.

As previously indicated, the new halohydrin compounds make possible the preparation of azo compounds having the formulas:

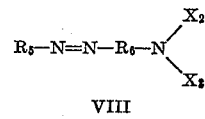

VIII and

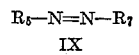

IX wherein $R_5$ represents a monocyclic aryl nucleus of the benzene series, $R_6$ represents a monocyclic aryl nucleus of the benzene series or a naphthalene nucleus, $X_2$ represents a 3,3,3-trifluoro 2-hydroxypropyl group, a 3,3-difluoro-2-hydroxypropyl group, a 3,3,3-trifluoro-2-methyl-2-hydroxypropyl group, a 3,3-difluoro-2-methyl-2-hydroxypropyl group, a 4,4,4-trifluoro-2-hydroxybutyl group, a 4,4,4-difluoro-2-hydroxybutyl group, an α - trifluoromethyl-β-hydroxyethyl group

an α-difluoromethyl-β-hydroxyethyl group

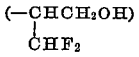

an α-methyl-α-trifluoromethyl-β-hydroxyethyl group

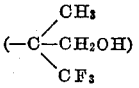

an α-methyl-α-difluoromethyl-β-hydroxyethyl group

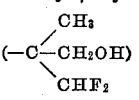

or an α-(α,α-difluoroethyl)-β-hydroxyethyl group

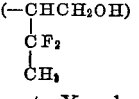

$X_3$ represents in addition to $X_2$ a hydrogen atom, a β-hydroxyethyl group, a β-hydroxypropyl group, a γ-hydroxypropyl, a β,γ-hydroxypropyl group, a δ-hydroxybutyl group, an alkyl group having one to four, inclusive, carbon atoms or a monoalkoxyalkyl group having three to four, inclusive, carbon atoms, $R_7$ represents a tetrahydroquinoline nucleus or a benzomorpholine nucleus and wherein the nuclear nitrogen atom of said tetrahydroquinoline or benzomorpholine nucleus contains an $X_2$ group, wherein $X_2$ has the meaning given to it above. The preparation of the above azo compounds is illustrated hereinafter.

*Example 34.*—0.1 gram mole of o-aminophenylmethylsulfone is diazotized in the usual manner and the diazonium solution obtained is added to an iced hydrochloric acid solution containing 0.1 gram mole of N-β-hydroxy-γ-trifluoropropylaniline. The coupling reaction which takes place is completed by adding sodium carbonate. The dye compound which forms is recovered by filtration, washed with water and dried. It has the formula

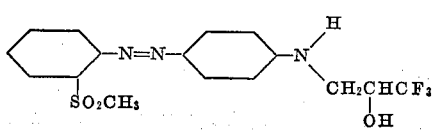

and colors cellulose acetate textile materials orange shades.

By the use of 0.1 gram mole of N-β-hydroxy-γ-difluoropropylaniline in place of N-β-hydroxy-γ-trifluoropropylaniline in the foregoing example, a dye compound is obtained which similarly colors cellulose acetate textile materials orange shades.

*Example 35.*—0.1 gram mole of p-aminoacetophenone is diazotized in the usual manner and the diazonium compound obtained is coupled with 0.1 gram mole of N-ethyl - N-β-hydroxy-γ-trifluoropropylaniline. The coupling reaction is carried out in an iced hydrochloric acid solution. Upon completion of the coupling reaction, the dye compound is recovered by filtration, washed well with water and dried. It colors cellulose acetate textile materials orange shades.

*Example 36.*—0.1 gram mole of p-nitroaniline is diazotized and the diazonium compound obtained is coupled with 0.1 gram mole of N-bis-β-hydroxy-γ-trifluoropropyl-m-toluidine. The coupling reaction is carried out in an iced hydrochloric acid medium. Upon completion of the coupling reaction, the dye compound formed is recovered by filtration, washed well with water and dried. It colors cellulose acetate textile materials scarlet shades.

By the use of 0.1 gram mole of N-bis-β-hydroxy-γ-difluoropropyl-m-toluidine in place of N-bis-β-hydroxy-γ-trifluoropropyl-m-toluidine in the foregoing example, a dye compound is obtained which likewise colors cellulose acetate textile materials scarlet shades.

*Example 37.*—0.1 gram mole of p-nitro-o-chloroaniline is diazotized and the diazonium compound obtained is coupled in the usual manner with 0.1 gram mole of N-β-cyanoethyl-N-β-hydroxy - γ - trifluoropropyl-m-chloroaniline. Coupling is carried out in an iced hydrochloric acid solution. Upon completion of the coupling reaction, the dye compound formed is recovered by filtration, washed with water and dried. It colors cellulose acetate textile materials scarlet shades.

*Example 38.*—0.1 gram mole of p-nitro-o-fluoroaniline is diazotized in the usual manner and the diazonium compound obtained is coupled in the usual manner with 0.1 gram mole of N-β-hydroxyethyl-N-β-hydroxy-β-methyl - γ - trifluoropropyl - 2 - methoxy-5-chloroaniline. Upon completion of the coupling reaction which is carried out in an iced hydrochloric acid solution, the dye compound formed is recovered by filtration, washed well with water and dried. It colors cellulose acetate textile materials pinkish-scarlet shades.

*Example 39.*—0.1 gram mole of p-nitroaniline is diazotized and the diazonium compound obtained is coupled in the usual manner with 0.1 gram mole of N-β-carbomethoxyethyl - N-β-hydroxy-γ-difluoropropylaniline. Upon completion of the coupling reaction, the dye compound is recovered by filtration, washed with water and dried. It colors cellulose acetate textile materials orange shades.

*Example 40.*—0.1 gram mole of 5-nitro-2-trifluoromethylaniline is diazotized with nitrosyl sulfuric acid and the diazonium compound thus obtained is poured into water. The solution thus formed is added to 0.1 gram mole of 1-N-β-hydroxy - γ - trifluoropropylamino-5-naphthol. The coupling reaction which takes place is completed by adding sodium carbonate. The dye compound formed is recovered by filtration, washed well with water and dried. It colors cellulose acetate textile materials greenish-blue shades.

*Example 41.*—0.1 gram mole of 2-amino-5-nitrophenylmethylsulfone is diazotized in nitrosyl sulfuric acid and the diazonium compound obtained is added to a cold dilute sulfuric acid solution of N-β-hydroxy-γ-trifluoropropyl-2-methyltetrahydroquinoline. The coupling reaction which takes place is completed by adding sodium carbonate. The dye compound formed is recovered by filtration, washed well with water and dried. It colors cellulose acetate textile materials violet shades.

*Example 42.*—0.1 gram mole of 2-amino-5-nitrobenzenesulfonethylamide is diazotized in a mixture of nitrosyl sulfuric acid, sulfuric acid and acetic acid. The diazonium solution thus obtained is poured into water and the precipitated diazonium compound is recovered by filtration, washed with water and then added to an acetic acid solution of 1 gram mole of N-β-hydroxy-γ-trifluoropropyl-2,7-dimethyltetrahydroquinoline. Upon completion of the coupling reaction which takes place, the dye compound formed is precipitated by adding water, recovered by filtration, washed with water and dried. It colors cellulose acetate textile materials violet shades.

*Example 43.*—0.1 gram mole of 2-amino-5-nitrophenylmethylsulfone is diazotized in nitrosyl sulfuric acid and the diazonium compound obtained is added to a cold dilute sulfuric acid solution of 0.1 gram mole of N - β-hydroxy-γ-trifluoropropylbenzomorpholine. The coupling reaction which takes place is completed by adding sodium carbonate. The dye compound that forms is recovered by filtration, washed well with water and dried. It colors cellulose acetate textile materials violet shades.

The following tabulation further illustrates these azo compounds, together with the color they produce on cellulose acetate textile materials. The compounds indicated below may be prepared by diazotizing the amines listed under the heading "Amine" and coupling with the compound specified in the column entitled "Coupling components." The diazotization and coupling reactions are carried out following standard procedures such as those disclosed in Examples 34 to 43, inclusive.

| Amine | Coupling Components | Color |
|---|---|---|
| o-aminophenylmethylsulfone. | N - β - hydroxy - γ - trifluoropropylaniline. | Yellowish-red. |
| Do | N - β - hydroxy - γ - trifluoropropyl-α-naphthylamine. | Do. |
| p-aminoacetophenone | N - β - hydroxy-γ-difluoropropylaniline. | Yellowish-orange. |
| Do | 1 - N - β - hydroxy - γ - difluoropropyl - o - chloroaniline. | Do. |
| Do | N - β - hydroxy - γ - trifluoropropylamino - 5 - naphthol. | Do. |
| p-nitroaniline | N - β - hydroxy - γ - difluoropropyl - o - toluidine. | Do. |
| Do | N - β - hydroxy - γ - trifluoropropyl - m - chloroaniline. | Yellowish-red. |
| Do | N - β - hydroxy - β - methyl - γ - difluoro - m - chloroaniline. | Do. |
| Do | 1 - N - β - hydroxy - γ - trifluoropropylamino-5-naphthol. | Violet. |
| Do | N - β - cyanoethyl - N - β - hydroxy - γ - difluoropropylaniline. | Red. |
| Do | N - β - hydroxy - γ - trifluoropropyltetrahydroquinoline. | Red violet. |
| p-nitro-o-chloroaniline | N - β - hydroxy - γ - trifluoropropylbenzomorpholine. | Do. |
| Do | N - β - hydroxy - δ - trifluorobutyl - 2 - methylbenzomorpholine. | Do. |
| Do | N - ethyl - N - β - hydroxy - γ - difluoropropylaniline. | Red. |
| Do | N - β - hydroxy - δ - trifluorobutylaniline. | Do. |
| Do | N, N - di(β - hydroxy - γ - trifluoropropyl) aniline. | Do. |
| 2-nitro-4-cyanoaniline | N - ethyl - N - β - hydroxy - γ - trifluoropropyl - m - chloroaniline. | Rubine. |
| Do | N - ethyl - N - β - hydroxy - γ - trifluoropropylaniline. | Do. |
| Do | N - β - hydroxy - δ - trifluorobutyl - α - naphthylamine. | Violet. |
| Do | N - β - hydroxy - γ - difluoropropyl - α - naphthylamine. | Do. |
| p-nitro-o-cyanoaniline | 1 - N - β - hydroxy-γ-trifluoropropylamino - 5 - naphthol. | Blue. |
| Do | N - ethyl - N - β - hydroxy - γ - trifluoropropyl - m - toluidine. | Rubine. |
| Do | N - β - hydroxy - γ - trifluoropropylaniline. | Red. |
| 2-nitro-4-thiocyanoaniline | N - β - hydroxy - γ - difluoropropylaniline. | Orange. |
| Do | N - ethyl - N - β - hydroxy - γ - trifluoropropyl - m - anisidine. | Do. |
| Do | N-methyl-N-β-hydroxy-γ-difluoropropylaniline. | Do. |
| p - nitro - o - trifluoromethylaniline. | N - ethyl-N-β-hydroxy-γ-trifluoropropyl-o-anisidine. | Do. |
| Do | N - ethyl - N - β - hydroxy - γ - trifluoropropylcresidine. | Do. |

| Amine | Coupling Components | Color |
|---|---|---|
| p-nitro-o-trifluoromethyl-aniline. | N-β-hydroxy-γ-trifluoropropyl-2,7-dimethyl-tetrahydroquinoline. | Violet. |
| Do | N-β-hydroxy-γ-difluoropropyl-2,5-dimethylbenzomorpholine. | Rubine. |
| p-nitro-o-methoxyaniline. | N-β-hydroxy-γ-trifluoropropylaniline. | Red. |
| Do | N-ethyl-N-β-hydroxy-β-methyltrifluoropropyl-m-toluidine. | Rubine. |
| p-nitro-o-methylaniline | N-β-hydroxy-γ-trifluoropropylaniline. | Orange. |
| Do | N-β-hydroxyethyl-N-β-hydroxy-γ-trifluoropropylaniline. | Red. |
| Do | N-β-cyanoethyl-N-β-hydroxy-γ-difluoropropylaniline. | Do. |
| 2-amino-5-nitrophenyl-methylketone. | N-β-sulfatoethyl-N-β-hydroxy-γ-trifluoropropylaniline. | Rubine. |
| Do | N-β-hydroxy-γ-trifluoropropyl-2-methyltetrahydroquinoline. | Do. |
| Do | N-β-hydroxy-δ-difluorobutyltetrahydroquinoline. | Do. |
| Do | N-β-hydroxy-δ-difluorobutylaniline. | Do. |
| 2-amino-5-nitro-phenylmethylsulfone. | N-β-hydroxy-δ-difluorobutyl-m-chloroaniline. | Do. |
| Do | N-β-hydroxy-γ-trifluoropropyl-2-methylbenzomorpholine. | Do. |
| 2-amino-5-nitro-benzenesulfonethylamide. | N-β-hydroxy-γ-trifluoropropylaniline. | Red. |
| Do | N-β-hydroxy-γ-difluoropropyl-2-methylbenzomorpholine. | Rubine. |
| Do | N-β-hydroxy-γ-trifluoropropyl-2,5-dimethylbenzomorpholine. | Violet. |
| 2,4-dinitroaniline | N-β-hydroxy-γ-trifluoropropyl-m-bromoaniline. | Rubine. |
| Do | N-β-hydroxy-N-γ-difluoropropyl-2,7-dimethylbenzomorpholine. | Violet. |
| 2,4-dinitro-6-chloroaniline | N-β-hydroxy-γ-trifluoropropyl-m-fluoroaniline. | Do. |
| Do | N-β-sulfatoethyl-N-β-hydroxy-γ-trifluoropropylaniline. | Do. |
| Do | N-β-hydroxy-γ-trifluoropropyl-α-naphthylamine. | Blue. |
| 2,4-dinitro-6-hydroxyaniline. | N-β-hydroxy-γ-difluoropropylaniline. | Violet. |
| Do | N-β-hydroxypropyl-N-β-hydroxy-γ-trifluoropropylaniline. | Do. |
| 2,4-dinitro-6-cyanoaniline | N-β-hydroxy-γ-trifluoropropylaniline. | Do. |
| Do | N-β-hydroxyethyl-N-β-hydroxy-γ-difluoropropylaniline. | Do. |
| Do | N-β-hydroxy-γ-trifluoropropyl-2,7-dimethylbenzomorpholine. | Do. |
| 2,4-dinitro-6-trifluoromethylaniline. | 1-N-β-hydroxy-γ-trifluoropropylamino-5-naphthol. | Blue. |
| Do | N-β-hydroxy-γ-trifluoropropyl-2,7-dimethyltetrahydroquinoline. | Do. |
| Do | N-β-hydroxy-γ-trifluoropropyl-5-acetoaminotetrahydroquinoline. | Do. |
| Do | N-allyl-N-β-hydroxy-γ-trifluoropropylaniline. | Violet. |
| 2-amino-3,5-dinitrobenzenesulfonethylamide. | N-β-hydroxy-γ-difluoropropylaniline. | Rubine. |
| 2-amino-3,5-dinitrophenylmethylsulfone. | N-β-hydroxy-γ-trifluoropropylaniline. | Do. |
| Do | 1-N-β-hydroxy-γ-trifluoropropylamino-5-naphthol. | Blue. |

*Example 44.*—25 grams of sodium-α-anthraquinone sulfonic acid, 20 cc. of water and 100 grams of 3,3,3-trifluoro-2-hydroxy-propylamine are reacted together at 150° C.–180° C. for 10 hours in an autoclave. When cool, the autoclave is opened and the contents are filtered to recover the reaction product which is washed well with water and dried. 1-β-hydroxy-γ-trifluoropropylaminoanthraquinone is thus obtained. It colors cellulose acetate textile materials reddish-orange shades.

By the use of an equivalent amount of 3,3-difluoro-2-hydroxypropylamine in place of 3,3,3-trifluoro-2-hydroxypropylamine in the foregoing reaction, 1-β-hydroxy-γ-difluoropropylaminoanthraquinone is obtained. It colors cellulose acetate textile materials reddish-orange shades.

*Example 45.*—25 grams of sodium-1,5-anthraquinonedisulfonate, 100 grams of 3,3-difluoro-2-hydroxypropylamine and 200 cc. of water are placed in an autoclave and heated at 150° C.–180° C. for 10 hours. When cool, the contents of the autoclave are filtered to recover the reaction product on the filter which is washed well with water and dried. 1,5-bis-β-hydroxy-γ-difluoropropylaminoanthraquinone is thus obtained. It colors cellulose acetate textile materials red shades.

*Example 46.*—25 grams of sodium-1,5-anthraquinonedisulfonate, 120 grams of 3,3,3-trifluoro-2-hydroxypropylamine and 200 cc. of water are placed in an autoclave and heated together at 150° C.–180° C. for 10 hours. Upon cooling, the contents of the autoclave are filtered to obtain the reaction product upon the filter. The reaction product is washed well and dried. 1,5-bis-β-hydroxy-γ-trifluoropropylaminoanthraquinone which colors cellulose acetate textile materials red shades is obtained.

*Example 47.*—24 grams of leucoquinizarin are dissolved in 500 cc. of n-butyl alcohol and the reaction mixture thus obtained is heated to boiling. Then 13 grams of 3,3,3-trifluoro-2-hydroxypropylamine in 50 cc. of n-butyl alcohol are added dropwise with stirring over a period of 1 hour. Refluxing is continued until no further change takes place. The leuco form of the reaction product thus prepared is oxidized to its nonleuco form with sodium perborate and the dye product is precipitated from the reaction mixture by adding water. The reaction product is recovered by filtration, washed with water and dried. 1-β-hydroxy-γ-trifluoropropyl-amino-4-hydroxyanthraquinone which colors cellulose acetate textile materials violet shades is thus obtained.

By the use of an equivalent amount of 3,3-difluoro-2-hydroxypropylamine in place of 3,3,3-trifluoro-2-hydrodroxypropylamine in the above example, 1-β-hydroxy-γ-difluoropropylamino-4-hydroxyanthraquinone is obtained. It colors cellulose acetate textile materials reddish-violet shades.

*Example 48.*—24 grams of leucoquinizarin and 25 grams of 3,3-difluoro-2-hydroxypropylamine are reacted together and worked up in accordance with the procedure described in Example 47. 1,4-bis-β-hydroxy-γ-difluoropropylaminoanthraquinone which colors cellulose acetate textile materials reddish-blue shades is obtained.

By the use of an equivalent amount of 3,3,3-trifluoro-2-hydroxypropylamine in place of 3,3-difluoro-2-hydroxypropylamine in the above example, 1,4-bis-β-hydroxy-γ-trifluoropropylaminoanthraquinone is obtained. It colors cellulose acetate textile materials blue shades.

*Example 49.*—33.5 grams of 1-β-hydroxy-γ-trifluoropropylaminoanthraquinone are dissolved in 27.5 cc. of pure and dry pyridine at about 95° C. Then 17 grams of bromine are added dropwise. Upon completion of the bromination reaction which takes place, the reaction mixture is cooled while stirring and the desired product crystallizes out. 1-β-hydroxy-γ-trifluoropropylamino-4-bromoanthraquinone is thus obtained.

By the use of an equivalent amount of 1-β-hydroxy-β-methyl-γ-trifluoropropylaminoanthraquinone in place of 1-β-hydroxy-γ-trifluoropropylaminoanthraquinone in the above reaction, 1-β-hydroxy-β-methyl-γ-trifluoropropylamino-4-bromoanthraquinone is obtained.

*Example 50.*—33 grams of 1-β-hydroxy-β-methyl-γ-difluoropropylaminoanthraquinone are reacted with 17 grams of bromine in accordance with the procedure described in Example 49. 1-β-hydroxy-β-methyl-γ-difluoropropylamino-4-bromoanthraquinone is thus obtained.

*Example 51.*—31.7 grams of 1-β-hydroxy-β-methyl-γ-difluoropropylaminoanthraquinone are dissolved in 300 cc. of acetic acid and 17 grams of anhydrous sodium acetate are added. Then 66 grams of bromine are added dropwise with stirring to the reaction mixture and after all the bromine has been added the reaction mixture is warmed to complete the bromination reaction. The reaction product which forms is recovered by filtration and then purified by crystallization from a solvent such as chlorobenzene, acetic acid or N-butyl alcohol. The red product is 1-β-hydroxy-β-methyl-γ-difluoropropylamino-2,4-dibromoanthraquinone.

By the use of an equivalent weight of 1-β-hydroxy-γ-difluoropropylaminoanthraquinone in place of 1-β-hydroxy-β-methyl-γ-difluoropropylaminoanthraquinone in the example, 1-β-hydroxy-γ-difluoropropylamino-2,4-dibromoanthraquinone is obtained.

*Example 52.*—10 grams of 1-β-hydroxy-β-methyl-γ-trifluoropropylamino-4-bromoanthraquinone are heated in 100 cc. of n-butyl alcohol with 10 grams of β-hydroxyethylamine using cuprous acetate as a catalyst and potassium acetate to react with the hydrogen bromide liberated during the reaction. Upon working up the reaction mixture in the usual manner, 1-β-hydroxy-β-methyl-γ-trifluoropropylamino - 4 - β - hydroxyethylaminoanthraquinone is obtained. It colors cellulose acetate textile materials blue shades.

*Example 53.*—50 grams of 1-β-hydroxy-γ-trifluoropropylamino - 4 - bromoanthraquinone, 57 grams of p-aminophenyl-β-hydroxy-β-ethoxy-β-ethoxyethyl ether, 17 grams of potassium acetate and 2 grams of copper acetate are heated in 100 cc. of n-butyl alcohol on a steam bath for 5 to 6 hours. After cooling, the reaction mixture is poured into 3 liters of cold water. After stirring the reaction mixture thus obtained for several hours, the somewhat oily dye that separates solidifies. The 1-β-hydroxy-γ-trifluoropropylamino-4-p-(β-hydroxy-β-ethoxy-β-ethoxyethoxy) phenylaminoanthraquinone formed is recovered by filtration, washed well with water and dried. It is purified by crystallization from toluene. It colors cellulose acetate textile materials greenish-blue shades.

*Example 54.*—0.1 gram mole of 1-phenylamino-4-bromoanthraquinone is reacted with 0.11 gram mole of 3,3,3-trifluoro-2-hydroxypropylamine in accordance with the procedure described in Example 53. 1-phenylamino-4-β-hydroxy-γ-trifluoropropylaminoanthraquinone is obtained. It colors cellulose acetate textile materials greenish-blue shades.

*Example 55.*—10 grams of 1-β-hydroxy-γ-trifluoropropylamino-2,4-dibromoanthraquinone are reacted in boiling n-butyl alcohol with 10 grams of 3,3,3-trifluoro-2-hydroxypropylamine, 0.1 gram of copper acetate and 5 grams of sodium acetate. When no further color change takes place toward the blue, the reaction mixture is worked up in the usual manner. 1,4-di-β-hydroxy-γ-trifluoropropylamino - 2 - bromoanthraquinone is obtained. It colors cellulose acetate textile materials bluish-violet shades.

*Example 56.*—10 grams of 1-β-hydroxyethylamino-2,4-dibromoanthraquinone are reacted in n-butyl alcohol with 10 grams of 3,3,3-trifluoro-2-hydroxypropylamine, 4 grams of potassium acetate and .05 gram of copper acetate. When no further color change takes place toward the blue, the reaction mixture is worked up in the usual manner to recover the reaction product. 1-β-hydroxyethylamino - 2 - bromo - 4 - β-hydroxy-γ-trifluoropropylaminoanthraquinone is obtained. It colors cellulose acetate textile materials reddish-blue shades.

*Example 57.*—27 grams of leuco 1,4,5,8-tetrahydroxyanthraquinone are reacted in 250 cc. of n-butyl alcohol with 22 grams of 3,3,3-trifluoro-2-hydroxypropylamine until the reaction is complete. The leuco 1,4-di-β-hydroxy - γ - trifluoropropylamino - 5,8 - dihydroxyanthraquinone formed is oxidized with sodium perborate or with air to its nonleuco form. 1,4-di-β-hydroxy-γ-trifluoropropylamino-5,8-dihydroxyanthraquinone is precipitated by the addition of water, recovered by filtration, washed with water and dried. It colors cellulose acetate textile materials greenish-blue shades.

*Example 58.*—27 grams of leuco-1,4,5,8-tetrahydroxyanthraquinone are placed in 250 cc. of n-butyl alcohol and 15 grams of 3,3,3-trifluoro-2-methyl-2-hydroxypropylamine are added dropwise with stirring over a period of 1 hour while heating to reflux. Refluxing is continued for one more hour and then 10 grams of β-hydroxyethylamine are added and the reaction mixture is refluxed with stirring for several hours. Upon working up the reaction mixture, 1-β-hydroxy-β-methyl - γ - trifluoropropylamino - 4 - β - hydroxyethylamino-5,8-dihydroxyanthraquinone is obtained. It colors cellulose acetate textile materials greenish-blue shades.

Following the procedures more particularly described in Examples 44 to 58, inclusive, the following anthraquinone compounds are readily prepared:

1-β-hydroxy-δ-trifluorobutylaminoanthraquinone, 1,4-di - β - hydroxy - γ - difluoropropylamino - 5,8 - dihydroxyanthraquinone, 1,4-di-β-hydroxy-δ-difluorobutylaminoanthraquinone, 1,4 - di - β - hydroxy - β - methyl - γ-trifluoropropylaminoanthraquinone, 1,4-di-β-hydroxy-δ-trifluorobutylaminoanthraquinone, 1 - β - hydroxy - γ - trifluoropropylamino-4-methylaminoanthraquinone, 1-β-hydroxy - γ - difluoropropylamino - 4 - n - butylaminoanthraquinone, 1 - β - hydroxy - γ - trifluoropropylamino - 4 - δ - hydroxybutylaminoanthraquinone, 1 - β - hydroxy - γ-trifluoropropylamino - 4 - β,β - difluoroethylaminoanthraquinone, 1 - β - hydroxy - γ - difluoropropylamino - 4 - β,β,β - trifluoroethylaminoanthraquinone, 1 - β - hydroxy-γ - difluoropropylamino - 4 - p - (β - ethoxy - β - ethoxy-β - ethoxyethoxy) phenylaminoanthraquinone, 1 - β-hydroxy - γ - trifluoropropylamino - 4 - o - (β - methoxy-β - ethoxyethoxy) phenylaminoanthraquinone, 1 - β - hydroxy - γ - trifluoropropylamino - 4 - β - ethoxyethylaminoanthraquinone and 1 - β - hydroxy - γ - difluoropropylamino - 2 - bromo - 4 - methylaminoanthraquinone.

*Example 59.*—10 grams of 1-β-hydroxy-γ-trifluoropropylamino-2-bromo-4-hydroxyanthraquinone are dissolved in 100 cc. of quinoline and 6 grams of cuprous cyanide are added. The reaction mixture resulting is heated with stirring to about 175° C. and maintained at this temperature until no further color change takes place. Then the reaction mixture is cooled and steam distilled to remove the quinoline. 1-β-hydroxy-γ-trifluoropropylamino-2-cyano-4-hydroxyanthraquinone operates as a solvent and is recovered by filtration and then recrystallized from ethyl alcohol. It colors cellulose acetate textile materials pinkish-red shades.

By the use of an equivalent weight of 1-β-hydroxy-β-methyl - γ - difluoropropylamino - 2 - bromo - 4 - hydroxyanthraquinone in place of 1-β-hydroxy-γ-trifluoropropylamino-2-bromo-4-hydroxyanthraquinone in the foregoing example, 1-β-hydroxy-β-methyl-γ-difluoropropylamino-2-cyano-4-hydroxyanthraquinone is obtained.

*Example 60.*—10 grams of 1-β-hydroxy-γ-difluoropropylamino-2-bromo-4-methylaminoanthraquinone are dissolved in 75 cc. of quinoline and 6 grams of cuprous cyanide are added. The reaction mixture thus obtained is heated with stirring to about 175° C. until no further color change takes place. Then the reaction mixture is cooled and steam distilled to remove the quinoline. 1-β-hydroxy - γ - difluoropropylamino - 2 - cyano - 4 - methylaminoanthraquinone precipitates out and is recovered by filtration and then recrystallized from ethyl alcohol. It colors cellulose acetate textile materials blue shades.

*Example 61.*—10 grams of 1-β-hydroxy-β-methyl-γ-trifluoropropylamino - 2 - bromo - 4 - cyclohexylaminoanthraquinone are dissolved in 100 cc. of pyridine and 6 grams of cuprous cyanide are added. The reaction mixture thus obtained is heated to boiling and when no further color change takes place the reaction mixture is cooled and steam distilled to remove the pyridine. 1-β-hydroxy - β - methyl - γ - trifluoropropylamino - 2 - cyano-4-cyclohexylaminoanthraquinone separates as a solid and is recovered by filtration. It is purified by recrystallization from ethyl alcohol. It colors cellulose acetate textile materials blue shades.

*Example 62.*—10 grams of 1-β-hydroxy-β-methyl-γ-trifluoropropylamino - 2 - bromo - 4 - phenylaminoanthraquinone are dissolved in 75 cc. of quinoline and 6 grams of cuprous cyanide are added. The reaction mixture is heated with stirring to about 175° C. and, when no further color change takes place, is cooled and steam distilled to remove the quinoline. 1-β-hydroxy-δ-methyl-γ-trifluoropropylamino - 2 - cyano - 4 - phenylaminoanthraquinone separates as a solid and is recovered by filtration, after which it is purified by recrystallization from ethyl alcohol. It colors cellulose acetate textile materials greenish-blue shades.

*Example 63.*—10 grams of 1-β-hydroxy-γ-trifluoropropylamino-2-bromoanthraquinone are dissolved in 100 cc. of quinoline and 6 grams of cuprous cyanide are added. The reaction mixture is heated and worked up as described in Example 59. 1-β-hydroxy-γ-trifluoropropylamino-2-cyanoanthraquinone is obtained. It colors cellulose acetate textile materials orange-red shades.

By brominating the reaction product which is obtained in pyridine in the presence of sodium acetate, 1-β-hydroxy-γ-trifluoropropylamino-2-cyano-4-bromoanthraquinone is obtained.

*Example 64.*—10 grams of 1-β-hydroxy-γ-trifluoropropylamino-2-cyano-4-bromoanthraquinone are placed in 50 cc. of β-methoxyethylamine together with 0.05 gram of copper acetate and 4 grams of potassium acetate. The reaction mixture is warmed gently and heating is continued until no further color change takes place. Then the reaction mixture is drowned in water and filtered to recover 1-β-hydroxy-γ-trifluoropropylamino-2-cyano-4-β-methoxyethylaminoanthraquinone on the filter. The reaction product is purified by crystallization from ethyl alcohol.

*Example 65.*—10 grams of 1,4-di-β-hydroxy-β-methyl-γ-trifluoropropylamino-2-bromoanthraquinone are reacted with 6 grams of cuprous cyanide in 100 cc. of quinoline in accordance with the procedure described in Example 59. Upon working up the reaction mixture in accordance with the procedure described in Example 59, 1,4-di-β-hydroxy-β - methyl - γ-trifluoropropylamino-2-cyanoanthraquinone is obtained. It colors cellulose acetate textile materials reddish-blue shades.

*Example 66.*—10 grams of 1-nitro-2-carboxyanthraquinone, 200 cc. of water and 15 grams of 3,3,3-trifluoro-2-methyl-2-hydroxypropylaniline are heated together on a steam bath for 6 to 10 hours. The reaction mixture is then cooled and the reaction product which precipitates is recovered by filtration and purified by crystallization from n-butyl alcohol. 1-β-methyl-β-hydroxy-γ-trifluoropropylamino-2-carboxyanthraquinone is thus obtained. It colors cellulose acetate textile materials orange-red shades.

*Example 67.*—5 grams of 1-β-methyl-β-hydroxy-γ-trifluoropropylamino-2-carboxyanthraquinone are placed in 25 cc. of acetic acid containing 2 grams of potassium acetate and 1 cc. of bromine in 25 cc. of acetic acid is added. The reaction mixture is stirred for 4 hours and then heated on a steam bath for 30 minutes. Upon cooling, 1-β-hydroxy-β-methyl-γ-trifluoropropylamino - 2 - carboxy - 4-bromoanthraquinone separates and is recovered by filtration, washed with water and dried.

*Example 68.*—10 grams of 1-β-hydroxy-β-methyl-γ-trifluoropropylamino-2-carboxy-4-bromoanthraquinone and 100 cc. of a 20% aqueous solution of β-hydroxyethylamine are boiled together with vigorous stirring. When no further color change toward the blue takes place, the reaction mixture is cooled and sodium chloride is added thereto to precipitate the reaction product. 1-β-hydroxy-β-methyl-γ-trifluoropropylamino-2-carboxy - 4 - β - hydroxyethylaminoanthraquinone is obtained on the filter upon filtration of the reaction mixture. It colors cellulose acetate textile materials blue shades.

*Example 69.*—10 grams of 1-β-hydroxy-γ-trifluoropropylamino-2-carboxy-4-bromoanthraquinone are reacted with 100 cc. of a 20% aqueous methylamine solution in accordance with the procedure described in Example 68. 1 - β-hydroxy-γ-trifluoropropylamino-2-carboxy-4-methylaminoanthraquinone is obtained. It colors cellulose acetate textile materials blue shades.

*Example 70.*—10 grams of 1-β-hydroxy-β-methyl-γ-trifluoropropylamino - 2 - carboxy - 4 - bromoanthraquinone are reacted with 50 cc. of benzylamine in accordance with the procedure described in Example 64. 1-β-hydroxy-β-methyl-γ-trifluoropropylamino - 2 - carboxy - 4 - benzylaminoanthraquinone is obtained. It colors cellulose acetate textile materials blue shades.

By the use of an equivalent amount of ammonia in place of benzylamine in the foregoing reaction and conducting the reaction in an autoclave, 1-β-hydroxy-β-methyl - γ - trifluoropropylamino - 2 - carboxy - 4 - aminoanthraquinone which colors cellulose acetate textile materials blue shades is obtained.

*Example 71.*—10 grams of 1-amino-2-carboxy-4-bromoanthraquinone are reacted in water with 10 grams of 3,3-difluoro-2-hydroxypropylamine. Upon working up the reaction mixture in the usual manner, 1-amino-2-carboxy-4-β-hydroxy-γ-difluoropropylaminoanthraquinone which colors cellulose acetate textile materials violet shades is obtained.

By the use of an equivalent amount of 3,3,3-trifluoro-2-hydroxypropylamine in place of 3,3-difluoro-2-hydroxypropylamine in the above example, 1-amino-2-carboxy-4-β-hydroxy-γ-trifluoropropylaminoanthraquinone which colors cellulose acetate textile materials violet shades is obtained.

*Example 72.*—10 grams of 1-ethylamino-2-carboxy-4-bromoanthraquinone, 25 cc. of a 50% aqueous solution of 3,3-difluoro-2-hydroxypropylamine, 4 grams of sodium acetate and 0.1 gram of copper acetate are heated together with stirring on a steam bath. Color develops at once and when no further color change toward the blue takes place the reaction product is precipitated by adding water, recovered by filtration, and then purified by crystallization from ethyl alcohol. 1-ethylamino-2-carboxy - 4 -β-hydroxy-γ-trifluoropropylaminoanthraquinone is obtained. It colors cellulose acetate textile materials blue shades.

By the use of an equivalent amount of 4,4,4-trifluoro-2-hydroxybutylamine and 4,4,4-difluoro-2-hydroxybutylamine, respectively, in place of 3,3,3-trifluoro-2-hydroxypropylamine in the foregoing example, 1-ethylamino-2-carboxy -4-β-hydroxy-δ-trifluorobutylaminoanthraquinone and 1-ethylamino-2-carboxy-4-β-hydroxy-δ-difluorobutylaminoanthraquinone, respectively, are obtained.

*Example 73.*—10 grams of 1-β-hydroxy-β-methyl-γ-trifluoropropylamino - 2-carboxy-4-bromoanthraquinone, 10 grams of aniline, 0.1 gram of copper acetate and 4 grams of sodium acetate are heated together with stirring on a steam bath for 2 to 3 hours. The reaction mixture is then heated to 180° C. and heating is continued at this temperature until no further color change toward the blue takes place. Upon working up the reaction mixture, 1 - β - hydroxy-β-methyl-γ-trifluoropropylamino - 2 - carboxy - 4-phenylaminoanthraquinone which colors cellulose acetate textile materials blue shades is obtained.

By the use of an equivalent amount of p-toluidine in place of aniline in the foregoing reaction, 1-β-hydroxy-β-methyl-γ-trifluoropropylamino - 2-carboxy-4-p-methylphenylaminoanthraquinone which colors cellulose acetate textile materials blue shades is obtained.

*Example 74.*—60 grams of 1-β-hydroxy-γ-trifluoropropylamino-2-carboxy-4-bromoanthraquinone, 57 grams of p-aminophenyl - β - hydroxy - β - ethoxy-β-ethoxyethyl ether, 17 grams of potassium acetate, 2 grams of copper acetate and 100 cc. of n-butyl alcohol are heated together on a steam bath for 5–6 hours. After cooling, the reaction mixture is poured into 3 liters of cold water and stirred for several hours. 1-β-hydroxy-γ-trifluoropropylamino-2-carboxy-4-p-(β-hydroxy-β - ethoxy - β - ethoxyethoxy) phenylaminoanthraquinone separates out and is recovered by filtration, washed with water and dried. It is purified by crystallization from toluene and colors cellulose acetate textile materials greenish-blue shades.

By the use of 60 grams of p-aminophenyl-β-ethoxy-β-ethoxy-β-ethoxyethyl ether and 51 grams of o-aminophenyl-β-hydroxy-β-ethoxyethyl ether, respectively, in place of the p-aminophenyl-β-hydroxy-β-ethoxy-β-ethoxyethyl ether in the foregoing example, 1-β-hydroxy-γ-trifluoropropylamino-2-carboxy-4-p-(β-ethoxy-β-ethoxy- β - ethoxyethoxy) phenylaminoanthraquinone and 1-β-hydroxy - γ-trifluoropropylamino-2-carboxy-4-o-(β-hydroxy-β-ethoxyethoxy) phenylaminoanthraquinone, respectively, are obtained. These compounds likewise color cellulose acetate textile materials greenish-blue shades.

*Example 75.*—61 grams of 1-β-hydroxy-β-methyl-γ-trifluoropropylamino-2-carboxy-4 - bromoanthraquinone, 57 grams of p-aminophenyl-β-hydroxy-β-ethoxy-β-ethoxyethyl ether, 17 grams of potassium acetate and 2 grams of copper acetate are heated together in 100 cc. of n-butyl alcohol in accordance with the procedure described in Example 74. 1-β-hydroxy-β-methyl-γ-trifluoropropylamino - 2 - carboxy - 4 - p-(β-hydroxy-β-ethoxy-β-ethoxyethoxy) phenylaminoanthraquinone which colors cellulose acetate textile materials greenish-blue shades is obtained.

By the use of 57 grams of 1-β-hydroxy-γ-difluoropropylamino-2-carboxy-4-bromoanthraquinone in place of 1 - β - hydroxy-β-methyl-γ-trifluoropropylamino-2-carboxy-4-bromoanthraquinone in the foregoing example, 1 - β - hydroxy-γ-difluoropropylamino-2-carboxy-4-p-(β-hydroxy-β-ethoxy-β-ethoxyethoxy) phenylaminoanthraquinone which colors cellulose acetate textile materials blue shades is obtained.

*Example 76.*—10 grams of 1-nitro-2-carbo-n-butoxyanthraquinone, 200 cc. of water and 10 grams of 3,3,3-trifluoro-2-hydroxypropylamine are heated together with stirring on a steam bath for 6 to 12 hours. Upon completion of the reaction, the reaction mixture is cooled and the 1-β-hydroxy-γ-trifluoropropylamino-2-carbo-n- butoxyanthraquinone which forms and which has the formula:

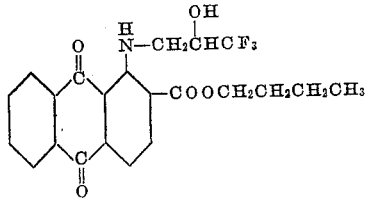

is recovered by filtration and purified by crystallization from n-butyl alcohol. It colors cellulose acetate textile materials orange shades.

By the use of 9 grams of 1-nitro-2-carbomethoxyanthraquinone in place of 1-nitro-2-carbo-n-butoxyanthraquinone in the foregoing example, 1-β-hydroxy-γ-trifluoropropylamino-2-carbomethoxyanthraquinone which colors cellulose acetate textile materials orange shades is obtained.

*Example 77.*—10 grams of 1-nitro-2-carboxyanthraquinone are placed in 150 cc. of n-butyl alcohol containing 1 cc. of sulfuric acid and the reaction mixture resulting is refluxed for 17 hours and filtered while hot. The filtrate is cooled to 25° C. and filtered to recover 1-nitro-2-carbo-n-butoxyanthraquinone on the filter.

By the use of 150 cc. of methyl alcohol, ethyl alcohol and n-propyl alcohol, respectively, in place of n-butyl alcohol in the foregoing example, 1-nitro-2-carbomethoxyanthraquinone, 1-nitro-2-carboethoxyanthraquinone and 1-nitro-2-carboxy-n-propoxyanthraquinone, respectively, are obtained.

*Example 78.*—5 grams of 1-β-hydroxy-β-methyl-γ-trifluoropropylamino - 2 - carbomethoxyanthraquinone are placed in 25 cc. of acetic acid containing 2 grams of potassium acetate and 1 cc. of bromine in 25 cc. of acetic acid is slowly added thereto. The reaction mixture resulting is stirred for 4 hours and then heated on a steam bath for 30 minutes. Then the reaction mixture is cooled and the 1-β-hydroxy-β-methyl-γ-trifluoropropylamino-2-carbomethoxy-4-bromoanthraquinone which has formed is recovered by filtration of the reaction mixture, washed with water and dried.

*Example 79.*—10 grams of 1-amino-2-carboxyanthraquinone are placed in 700 cc. of methyl alcohol containing 2 cc. of sulfuric acid and the reaction mixture is heated in an autoclave at 120° C. for 16 hours. The filtrate reaction mixture is then cooled and filtered. The filtrate is concentrated to 200 cc. and filtered to recover 1-amino-2-carbomethoxyanthraquinone on the filter. This compound is purified by crystallization from glacial acetic acid and then brominated in acetic acid to obtain 1-amino-2-carbomethoxy-4-bromoanthraquinone. The bromination reaction is carried out in accordance with the various bromination procedures described hereinbefore.

*Example 80.*—3 grams of 1-amino-2-carbomethoxy-4-bromoanthraquinone, 1.5 grams of potassium acetate, 0.2 gram of copper acetate and 50 cc. of 3,3,3-trifluoro-2-methyl-2-hydroxyanthraquinone are warmed together on a steam bath until no further color change toward the blue takes place. The reaction mixture thus obtained is poured into dilute hydrochloric acid and the 1-amino-2-carbomethoxy - 4 - β-hydroxy-β-methyl-γ-trifluoropropyl-aminoanthraquinone which forms is recovered by filtration, crystallized from ethyl alcohol and dried. It colors cellulose acetate textile materials reddish-blue shades.

By the use of an equivalent weight of 3,3-difluoro-2-hydroxyproylamine in place of 3,3,3-trifluoro-2-methyl-2-hydroxypropylamine in the above example, 1-amino-2-carbomethoxy - 4 - β - hydroxy-γ-difluoropropylaminoanthraquinone which colors cellulose acetate textile materials reddish-blue shades is obtained.

*Example 81.*—3 grams of 1-β-hydroxy-β-methyl-γ-trifluoropropylamino - 2 - carbomethoxy-4-bromoanthraquinone, 50 cc. of ethylamine, 1.5 grams of potassium acetate and 0.2 gram of copper acetate are heated in a stirring autoclave at about 75° C. for 6 hours. The reaction mixture is poured into dilute hydrochloric acid and the 1 - β - hydroxy-β-methyl-γ-trifluoropropylamino-2-carbomethoxy-4-ethylaminoanthraquinone which separates is recovered on the filter by filtration of the reaction mixture. It is purified by crystallization from n-butyl alcohol and dried. It colors cellulose acetate textile materials blue shades.

By the use of an equivalent amount of β-cyanoethylamine in place of ethylamine in the above reaction, 1-β-hydroxy - β - methyl - γ - trifluoropropylamino - 2 - carbomethoxy-4-β-cyanoethylaminoanthraquinone is obtained. It colors cellulose acetate textile materials blue shades.

*Example 82.*—4 grams of 1-β-hydroxy-β-methyl-γ-trifluoropropylamino - 2 - carbomethoxy - 4 - bromoanthraquinone, 1.5 grams of potassium acetate, 0.2 gram of coppper acetate and 30 cc. of freshly distilled aniline are heated together at 100° C. until a bright bluish-green color is produced which does not increase in intensity on further heating. Then the reaction mixture is poured into dilute hydrochloric acid and the 1-β-hydroxy-β-methyl-γ - trifluoropropylamino - 2 - carbomethoxy - 4 - phenylaminoanthraquinone which precipitates is recovered by filtration, washed with water and dried. It is purified by crystallization from n-butyl alcohol. It colors cellulose acetate textile materials bluish-green shades.

Following the procedures more particularly described in Examples 59 to 82, inclusive, the following compounds 1 - β - hydroxy - β - methyl - γ - difluoropropylamino - 2 - cyano - 4 - β - methoxyethylaminoanthraquinone, 1-β-hydroxy - γ - trifluoropropylamino-2-cyano-4-β-cyanoethylaminoanthraquinone, 1-β-hydroxy-β-methyl-γ-difluoropropylamino-2-carboxyanthraquinone, 1-β-hydroxy-γ-trifluoropropylamino-2-carboxy-4-bromoanthraquinone, 1-β-hydroxy - γ - difluoropropylamino - 2 - carboxy - 4 - β - hydroxyethylaminoanthraquinone, 1-β-hydroxy-β-methyl-γ - trifluoropropylamino - 2 - carboxy - 4 - hydroxyanthraquinone, 1-amino-2-carboxy-4-β-hydroxy-β-methyl-γ-trifluoropropylaminoanthraquinone, 1-amino-2-carboxy-4-β-hydroxy-β-methyl-γ-difluoropropylaminoanthraquinone, 1-β-hydroxyethylamino-2-carboxy - 4 - β - hydroxy - β - methyl-γ-trifluoropropylaminoanthraquinone, 1-β-hydroxyethylamino - 2 - carboxy - 4 - β - hydroxy - β - methyl - γ - difluoropropylaminoanthraquinone, 1-β-hydroxy-γ-difluoropropylamino - 2 - carboxy - 4 - o - (β - hydroxy - β - ethoxy - β - ethoxyethoxy) phenylaminoanthraquinone, 1 - β - hydroxy - β - methyl - γ - trifluoropropylamino-2-carboethoxyanthraquinone, 1-amino-2-carboethoxy - 4 - β - hydroxy - γ - trifluoropropylaminoanthraquinone, 1-β-hydroxy-γ-trifluoropropylamino-2-carbonbutoxy-4-β,γ-dihydroxypropylaminoanthraquinone, 1-β-hydroxy - β - methyl - γ - trifluoropropylamino - 2 - carbomethoxy - 4 - p - (β - hydroxy - β - ethoxy - β - ethoxyethoxy) phenylaminoanthraquinone, 1-β-hydroxy-γ-trifluoropropylamino - 2 - carbomethoxy - 4 - p - (β - hydroxy - β-ethoxy-β-ethoxyethoxy) phenylaminoanthraquinone, 1-β - hydroxy - γ - difluoropropylamino - 2 - carbomethoxy - 4-o-(β-hydroxy-β-ethoxy-β-ethoxyethoxy) phenylaminoanthraquinone, 1-β-hydroxy-δ-trifluorobutylamino-2-carbomethoxyanthraquinone, 1-β-hydroxy-δ-difluorobutylamino-2-carbomethoxyanthraquinone, 1-β-hydroxy-γ-trifluoropropylamino - 2 - carbomethoxy - 4 - p - (β - hydroxy - β - ethoxyethoxy)phenylaminoanthraquinone, 1 - β - hydroxy - γ - difluoropropylamino - 2 - carbomethoxy - 4-p-(β-ethoxy-β-ethoxy-β-ethoxyethoxy) phenylaminoanthraquinone and 1-β-hydroxy-γ-trifluoropropylamino-2-carbomethoxy-4-p-(β-methoxy-β-ethoxyethoxy) phenylaminoanthraquinone are readily prepared.

The new azo and anthraquinone compounds described herein may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The halohydrin compounds selected from the group consisting of 3,3,3-trifluoro-2-chloro-1-hydroxypropane, 3,3,3-trifluoro-2-bromo-1-hydroxypropane, 3,3,3-trifluoro-2-chloro-2-methyl-1-hydroxypropane, 3,3,3-trifluoro-2-bromo-2-methyl-1-hydroxypropane, 3,3-difluoro-2-chloro-1-hydroxypropane, 3,3-difluoro-2-bromo-1-hydroxypropane, 3,3-difluoro-2-chloro-2-methyl-1-hydroxypropane and 3,3-difluoro-2-bromo-2-methyl-1-hydroxypropane.

2. The compound having the formula:

$$CF_3\underset{\underset{Cl}{|}}{\overset{\overset{CH_3}{|}}{C}}CH_2OH$$

3. The compound having the formula:

$$CF_3\underset{\underset{Cl}{|}}{C}HCH_2OH$$

4. The compound having the formula:

$$CHF_2\underset{\underset{Cl}{|}}{C}HCH_2OH$$

5. The process of preparing a halohydrin compound selected from the group consisting of 3,3,3-trifluoro-2-chloro-1-hydroxypropane, 3,3,3-trifluoro-2-bromo-1-hydroxypropane, 3,3,3-trifluoro-2-chloro-2-methyl-1-hydroxypropane, 3,3,3-trifluoro-2-bromo-2-methyl-1-hydroxypropane, 3,3-difluoro-2-chloro-1-hydroxypropane, 3,3-difluoro-2-bromo-1-hydroxypropane, 3,3-difluoro-2-chloro-2-methyl-1-hydroxypropane and 3,3-difluoro-2-bromo-2-methyl-1-hydroxypropane, which comprises reacting a compound selected from the group consisting of 3,3,3-trifluoropropene, 3,3,3-trifluoro-2-methylpropene, 3,3-difluoropropene and 3,3-difluoro-2-methylpropene with an aqueous medium of a compound selected from the group consisting of hypochlorous acid and hypobromous acid at a temperature of about $-10°$ C. to $0°$ C.

6. The process of preparing a halohydrin compound selected from the group consisting of 3,3,3-trifluoro-2-chloro-1-hydroxypropane, 3,3,3-trifluoro-2-bromo-1-hydroxypropane, 3,3,3-trifluoro-2-chloro-2-methyl-1-hydroxypropane, 3,3,3-trifluoro-2-bromo-2-methyl-1-hydroxypropane, 3,3-difluoro-2-chloro-1-hydroxypropane, 3,3-difluoro-2-bromo-1-hydroxypropane, 3,3-difluoro-2-chloro-2-methyl-1-hydroxypropane, and 3,3-difluoro-2-bromo-2-methyl-1-hydroxypropane, which comprises adding a compound selected from the group consisting of 3,3,3-trifluoropropene, 3,3,3-trifluoro-2-methylpropene, 3,3-difluoropropene and 3,3-difluoro-2-methylpropene to an aqueous medium of a compound selected from the group consisting of hypochlorous acid and hypobromous acid at a temperature of about $-10°$ C. to $0°$ C.

References Cited in the file of this patent

UNITED STATES PATENTS

| | | |
|---|---|---|
| 2,062,002 | Groll et al. | Nov. 24, 1936 |
| 2,537,976 | Dickey | Jan. 16, 1951 |
| 2,559,628 | Joyce | July 10, 1951 |
| 2,561,516 | Ladd et al. | July 24, 1951 |